Dec. 22, 1964 L. M. MOYROUD 3,162,105

TYPE COMPOSING APPARATUS

Filed March 29, 1963 4 Sheets-Sheet 1

INVENTOR
LOUIS M. MOYROUD
BY Kenway Jenney & Hildreth
ATTORNEYS

Dec. 22, 1964 L. M. MOYROUD 3,162,105

TYPE COMPOSING APPARATUS

Filed March 29, 1963 4 Sheets-Sheet 2

INVENTOR.
LOUIS M. MOYROUD
BY Kenway, Jenney & Hildreth
ATTORNEYS

Dec. 22, 1964 L. M. MOYROUD 3,162,105

TYPE COMPOSING APPARATUS

Filed March 29, 1963 4 Sheets-Sheet 3

INVENTOR

LOUIS M. MOYROUD

BY Kenway Jenney & Hildreth

ATTORNEYS

Dec. 22, 1964 L. M. MOYROUD 3,162,105

TYPE COMPOSING APPARATUS

Filed March 29, 1963 4 Sheets-Sheet 4

INVENTOR.
LOUIS M. MOYROUD
BY Kenway, Jenney & Hildreth
ATTORNEYS

3,162,105
TYPE COMPOSING APPARATUS

Louis M. Moyroud, 50 Brooks St., West Medford, Mass.

Filed Mar. 29, 1963, Ser. No. 269,038
11 Claims. (Cl. 95—4.5)

The present invention relates generally to type composition, and more particularly to a machine for composing type from a very large selection of available characters, as one finds in the ideographic languages for example.

An object of this invention is to provide improvements in a type composing machine utilizing the teachings of the patent to Caldwell No. 2,950,800. Additional background information concerning this machine may be found in an article entitled "The Sinotype-A-Machine For the Composition of Chinese From a Keyboard," by Samuel H. Caldwell, appearing in the Journal of the Franklin Institute, vol. 267, No. 6, June 1959. The machine described by Caldwell is provided with a keyboard having keys representing the basic strokes, commonly-used combinations of strokes termed "entities," and instructions for such functions as shifting, back spacing, line spacing and photographing. Using Chinese as an example of an ideographic language, the article points out that the sequence of strokes used by a person skilled in the language in writing a given character is always the same. Thus every Chinese learns to write each character by using exactly the same strokes in exactly the same sequence. In general, each character is selected on the keyboard by depressing the appropriate stroke keys in the corresponding prescribed sequence for that character until a sufficient number of strokes has been selected to distinguish the desired character uniquely from any of the other characters available for composition. It should be borne in mind that the total number of selectable characters in a practical Chinese composing machine would probably not be less than 6,000 and may well exceed 8,000 for some composing work.

The Caldwell patent and said article describe a coding technique based on a minimum redundancy method, according to which each basic stroke has an assigned binary code value. No code of any length forms the beginning of a longer code. The most frequently used strokes have fewer digits in their binary values than the less frequently used strokes. Each selectable character in the machine can therefore be represented by the succession of individual binary stroke values arranged in the prescribed order of the strokes without spacing, as a single composite binary number. The patent also describes a mechanism for converting each composite binary character code number into a unique set of Cartesian coordinates whereby a character plate bearing all of the selectable characters may be located in relation to a fixed optical system to present the correct character in a photographing position. It is an object of this invention to provide a simpler, more dependable and faster operating optical character selection system for operation by the coding apparatus of said patent.

With the foregoing and other objects hereinafter appearing in view, the features of this invention include the provision of a rigid character support bearing a plurality of circles of characters, together with optical means capable of selective photography of the characters from any of the circles as the support revolves continuously about its axis.

Another feature of the invention resides in the use of a frame bearing a plurality of projection lenses, each lens corresponding to a different circle of characters, together with means for projecting flashes of light through any one of the selected lenses at predetermined instants of time when the selected characters are in position for projection to a common predetermined image position.

Other features of the invention reside in certain details of construction and in arrangements of the parts and modes of operation which will become more evident from the following description of a preferred embodiment thereof, having reference to the appended drawings wherein FIG. 1 is a plan view of the principal optical elements of a simplified illustrative form of the invention;

Figure 2:
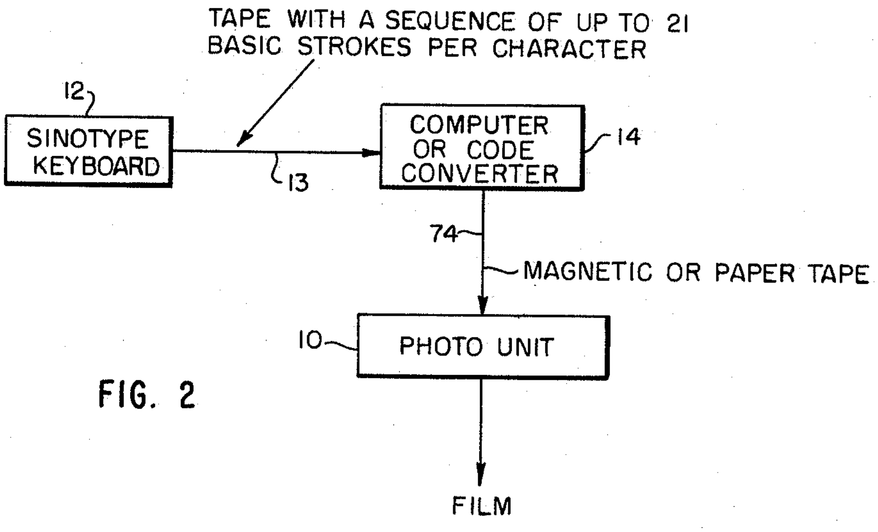
FIG. 2 is a block diagram illustrating the arrangement of the principal machine components of a photographic type composing machine or system of machines embodying the invention.

The photographic type composing machine according to this invention is adapted for use in conjunction with a storage device termed a "register" in which entries are made by operation of the keys of a keyboard 12 such as that described in the said Caldwell patent. Preferably, the register takes the form of memory tape 13 having multiple digital channels across its width dimension. Each longitudinal position on the tape contains the binary code of a single stroke. Suitable tapes and tape perforating machines for this purpose have been developed and are well known. Either a perforated paper tape or a magnetic tape may be employed, in which case the digital channels are of the binary type. The keyboard of said patent is simply modified to produce the tape by substituting tape punches or magnetic tape entry channels for the respective binary symbol entry A-relays of said patent. Referring to FIG. 2, the keyboard 12 is preferably the "Sinotype" keyboard described in said Caldwell patent and more particularly defined in said Caldwell article, wherein the keys comprise stroke, "entity" and instruction keys as previously mentioned. Each time a stroke key is depressed, a binary code is entered in the tape. After this code is entered the tape is automatically advanced to its next longitudinal position to receive the code for the next stroke of the character being selected by the operator. As described by Caldwell, the number of digits in the code of each stroke varies with the frequency of use of the stroke in ordinary text. In Chinese there are twenty-one basic strokes, but preferably three of these strokes are represented by both long and short forms, with the result that there are twenty-five available basic strokes for selection at the keyboard. The most frequently used strokes have only two digits, whereas the least frequently used stroke has twelve. Thus a twelve-channel tape is preferred for the described embodiment. The "entity" keys represent combinations of strokes that are frequently used, and the selection of such a key results in the successive entry of all of the stroke codes in the entity with alternate tape feeding by any suitable keyboard-operated automatic sequence entry means of a type well known in the art.

In order to select a given character, the stroke and "entity" keys are depressed successively until a sufficient number of strokes has been defined to distinguish the character uniquely from any of the other characters available for selection. It will be seen, therefore, that the code for each character of text is "built up" from the binary codes of the successive strokes in the character in a definitely prescribed order, this order being the same as that invariably employed in writing the characters.

Figure 1:
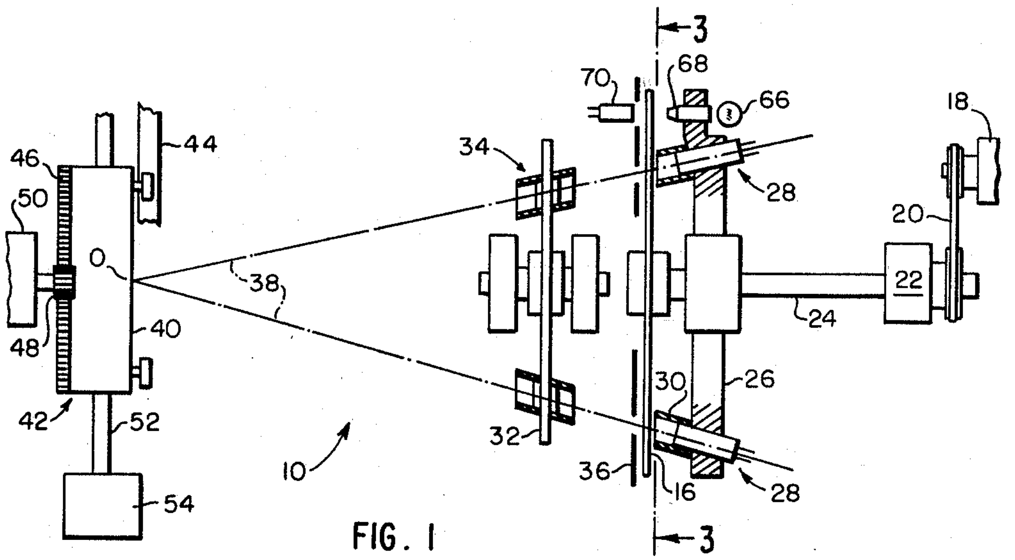
Figure 3:
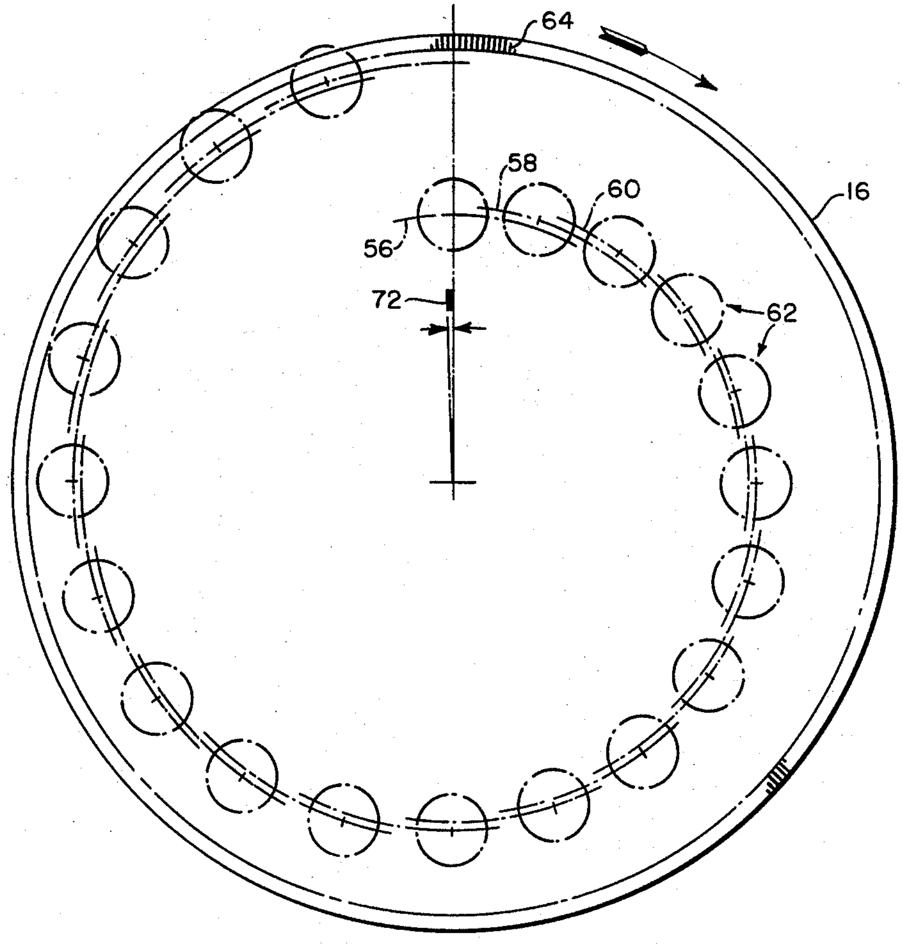
FIG. 3 is a view in elevation of the character disk taken on line 3—3 of FIG. 1.

The tape 13 is fed to a computer or code converter 14 having means to convert the binary code for each character into a pair of location coordinates uniquely representing the position of the character upon a rigid support 16 shown in FIGS. 1 and 3. The converter 14 may be the locator assembly 64 of said patent modified to cause the movement of each of the selector rods 68 thereof to produce said coordinates in the form of binary codes. Alternatively, it may be a suitable digital computer. In the illustrated embodiment the support 16 takes the form of a continuously rotating disk preferably made of glass upon which 10,000 Chinese characters appear as transparencies upon an opaque background. The disk is provided with means to rotate it continuously, this mechanism comprising a motor 18, drive belt 20, clutch 22 and shaft 24 secured to the disk 16. The shaft passes through a fixed rigid support 26 in which are mounted a number of flashing units 28. In the illustrated embodiment there are twenty such flashing units, annularly arranged with uniformly spaced radial distances from the axis of the shaft 24. Each of these flash units preferably comprises a gas filled flash tube of a known type, capable of emitting an intense flash of a duration which is short in comparison with the velocity of the characters on the rotating disk, and a light shield 30 to confine the emitted light to a particular area of the disk 16.

A lens frame 32 supports a number of lenses 34 in position to receive the light emitted by the flash units 28. The lens frame 32 is stationary during the photography of the characters, except that it may be rotated to change the point size in accordance with the modifications discussed below in connection with FIGS. 4 and 5.

There are as many lenses 34 as there are flash units 28 and each lens corresponds to and is used with only one flash unit. A mask 36 confines the light emitted through the character disk 16 so that each lens 34 receives only the light from its corresponding flash unit. The optical axes 38 of all of the lenses 34 pass through a common image receiving position 0. Each optical axis 38 also intersects the disk 16 at a predetermined unique distance from the axis of the shaft 24. In the example shown the characters are arranged upon the disk in twenty concentric circles of five hundred characters each, there being a circle for each lens, with the base lines of the characters being uniformly radially distributed from the axis of the shaft 24. The optical axes 38 of the respective lenses preferably intersect the base lines of the corresponding circles of characters.

Thus in each rotation of the disk 16, each of 10,000 Chinese characters will be situated at some instant in such a position that its corresponding lens 34 projects an image to the common image position 0.

The point 0 is illustrated as intersecting the front surface of a support 40 for a photographic film. The support 40 is mounted upon a carriage 42 adapted to slide along rails 44 in incremental steps, each step corresponding to the desired space between characters in the text. The characters are photographed successively in the same order in which they are composed, and the carriage 42 is advanced alternately with the photographing of the characters. The displacement of the carriage is accomplished by means of a rack 46 engaged through a pinion 48 with a variable escapement 50. The leading, that is, the spacing between the lines of text, is accomplished by rotation of a splined shaft 52 through operation of a suitable leading mechanism 54 of a commonly known type.

Referring more particularly to the character support 16 shown in FIG. 3, the illustrated embodiment comprises a piece of glass covered with a photographic emulsion. The characters are preferably of 3-point size. For clarity of illustration, the individual characters are not shown, but the base lines for the characters are represented by the broken lines 56, 58, 60 and so on. The circles 62 shown in broken ilnes have their centers in the optical axes 38 of the respective lenses 34, these axes intersecting the base lines of the characters.

In addition to the characters, the disk 16 is provided with a circle of slits 64, these slits comprising short radial transparent lines on an opaque background. The slits control the light passing from a continuous light source 66 (FIG. 1) through a condenser 68 to a photocell 70. The photocell 70 receives a light impulse from each of the slits 64 at the instant when each character is precisely located in photographic position opposite each of the lenses 34. At each such instant there is a character in each circle which is precisely located in photographic position opposite each of the twenty lenses. Thus each slit 64 is precisely located on the disk in relation to one character in each of the circles of characters. Therefore, the slits 64 are mutually spaced by the same angles as the angular displacement of characters in the individual circles, and there are as many slits as there are characters available for selection in each circle.

A single slit 72 (FIG. 3) is also provided on the disk 16, this slit being associated with a light source and a photocell (not shown) identical to the elements 66, 68 and 70. The slit 72 is used to generate a "start" pulse at the beginning of each revolution of the disk. This pulse controls the sequential operation of the photographing and spacing sections of the machine.

Referring to FIG. 2, the computer 14 produces a coded magnetic or paper tape 74 which gives a pair of coordinates for each selected character, these coordinates respectively representing a radial address code and an angular address code. The radial address code designates one of the twenty available circles of characters by preparing the actuating circuit of a corresponding flash unit 28. The angular address code corresponds to a count of the slits 64 by the photocell 70, measuring from the instant of an impulse in the photocell associated with the slit 72 to the instant when the particular slit 64 corresponding to the selected character actuates the photocell 70. It will be understood that at the latter instant the selected character is in projection position in the optical axis 38 of the lens 34 which corresponds to the selected flash unit 28. Thus the angular address code determines the instant of energization of the selected flash unit 28.

One example of a suitable tape 74 would be a 14-bit tape, providing 9 bits to identify up to 512 angular positions of the character disk, with 5 bits to identify one of the twenty circles of characters on the disk.

Since it is necessary to provide sufficient time for switching the various units in the intervals separating the photography of consecutive characters, a segment having no characters may be provided on the disk, whereby no character will be projected during a certain portion of its revolution. For example, the characters may be spaced angularly one and one-half per degree around each circle, thus providing for a maximum capacity in each circle of 540 character positions, of which only 500 positions would be used with the remaining 40 positions constituting "dead" travel time in each revolution.

Figure 4:
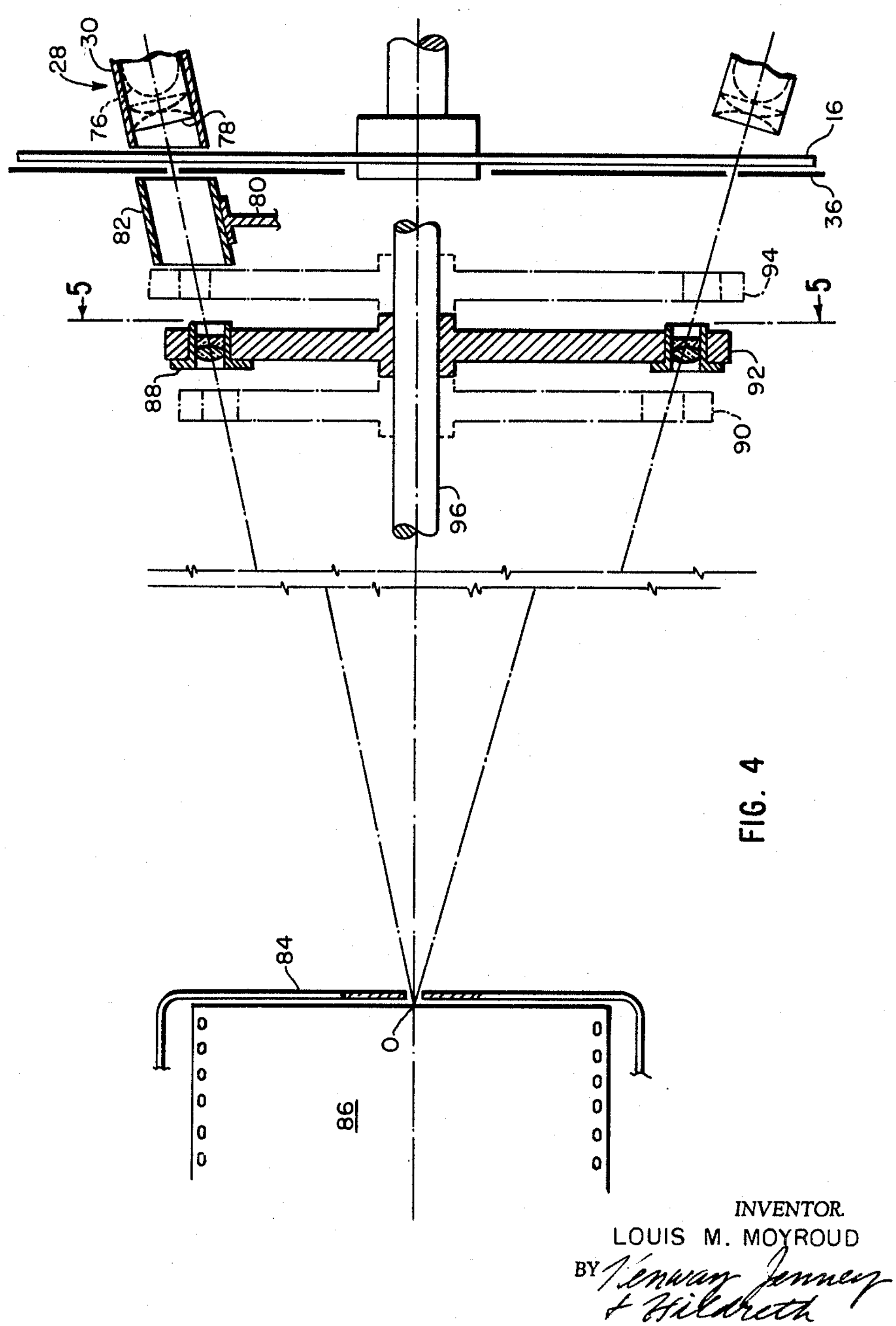
FIG. 4 is a plan view in greater detail of the character carrier and flash units and shows a modified arrangement of the projection lenses and their frame.
Figure 5:
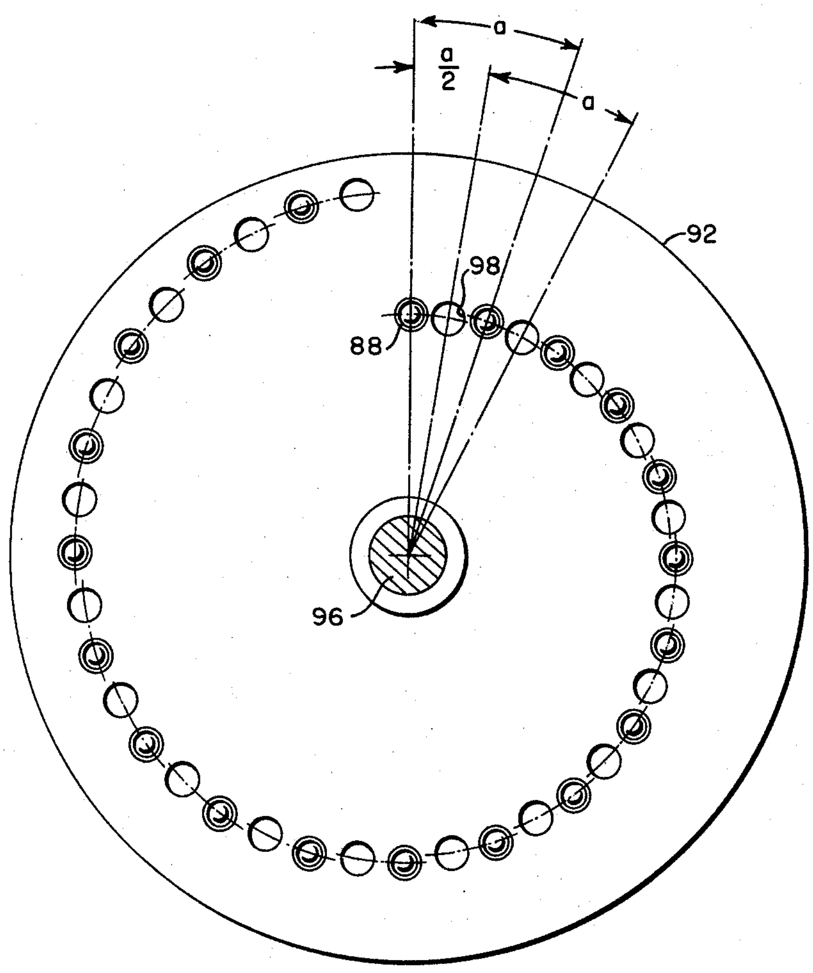
FIG. 5 is a view in elevation of a lens support taken on line 5—5 of FIG. 4.

FIG. 4 illustrates in detail the position of the disk 16 in relation to the flash units 28. Each flash unit includes a flash lamp 76 and a light condenser 78 mounted within a light shield 30. This figure also shows additional light shielding, comprising a stationary support 80 upon which are fixed a number of hollow tubes 82. Also, a light shield 84 having an aperture opposite the image point 0 is provided, whereby the light reaching the sensitive film 86 on the support 40 is restricted to the region of this point. It will be understood that the light shield 84 comprises a light-type container about the entire film.

Referring to FIG. 2, the photo unit 10 preferably includes the photocell-operated slit counting circuit described in the patent to Higonnet and Moyroud No. 2,775,172, this circuit producing an impulse to energize the selected flash unit 28 at the correct instant. More specifically, the circuit described in said patent is adapted to count the impulses generated by the photocell 70, and to produce a flash signal when the character disk has rotated to bring the selected character to the proper position before the flash unit of the circle to which it belongs and its corresponding lens 34.

The embodiment of FIG. 4 differs from that of FIG. 1, in that it shows lenses 88 which are mounted independently of their associated light shields 82.

As stated above, it is often desired to provide means for changing the point size of the projected character images. In this case the simplified structure of FIG. 1 is altered by substitution of a plurality of lens supports 90, 92 and 94 each pivotally supported on a common fixed shaft 96, but constrained against axial movement. Each of these supports is constructed in a similar manner, the support 92 being shown in elevation in FIG. 5 as illustrative. This support contains a plurality of projection lenses 88 at differing radii from the shaft axis and mutually angularly spaced by an angle "*a*." A hole 98 is associated with each lens, has its center at the same radial distance from the shaft axis as the optical axis of the corresponding lens, and is angularly displaced by the angle "*a*/2" from said optical axis. These clearance holes provide apertures for the passage of light through the lens frames not being used. Each lens frame has a projection position and an inactive position. In the projection position, the frame is rotated to bring the lenses into the light paths defined by the projection units 28 and the associated light masks. The lens frame may be rotated to the inactive position through the angle *a*/2, thereby presenting the holes 98 in said light paths.

It is obviously within the scope of the present invention to provide a machine of this type to project matter other than ideographic characters. For example, the machine could be used to select and project signs, symbols, pictures or patterns of various kinds. By employing suitable optical reduction, the elements above referred to as "characters" could be replaced by diagrams or even whole words of text. Thus the machine would have utility wherever it is desired to select and reproduce photographically selected items from a large number available in storage, for example, in data processing apparatus and file searching systems.

It will also be observed that the optical system described herein can be employed in the reverse direction in order to provide a pattern recognition device, for example, a machine to identify Chinese characters appearing in a printed text. Referring to FIG. 1, a cathode-ray tube may be provided with its face presented at the point 0, and the image of a character to be identified may be displayed at this point. Images of the character will be presented at each of the circle levels of the continuously rotating character disk. The disk could be identical to that previously described. In this case, the flash lamps are replaced by photocells to detect the identity or lack of identity between the projected images and a given character on the disk. A photocell would provide a signal at the instant when the light defining the image of the character is totally obliterated by the character disk. Thus if the projected character is luminous the characters on the disk are opaque on a transparent background, and if the character image is opaque on a luminous background, the characters on the disk are transparencies on an opaque background as described above. Thus the appropriate photocell will provide a signal only during a time interval when a pulse is being generated by the photocell 70. It will be evident that the machine can determine the identity of the character from the particular photocell that provides the signal and from the number of impulses that have passed from the generation of an impulse by the slit 72 (FIG. 3) until the instant of recognition (light obliteration). Preferably, the impulses from the photocell 70 are used to sustain a gate to make all of the photocells responsive to the projected character images only during the instants when light obliteration can occur, that is, only during the photocell impulses themselves.

While the invention has been described with reference to a preferred embodiment and certain modifications thereof, it will be understood that various other modifications and arrangements or adaptations of parts may also be employed by one skilled in this art without departing from the spirit or scope of this invention.

Having thus described the invention, I claim:

1. Type composing apparatus having, in combination, a rigid support bearing a plurality of character circles having their centers in a common axis and each having a plurality of characters, means to rotate said support continuously about said axis, image recording means having an image receiving surface intersected by said axis, a frame bearing as many lenses as there are circles of characters, each lens being supported in a predetermined position so that it projects successively to a common image position on said surface all of the characters in a corresponding circle as the support is rotated, said image position being identical for all lenses and their corresponding circles, means to illuminate selectively by a flash of brief duration the portion of the support in the projection axis of any selected lens corresponding to a circle containing a selected character, and means to time the instant of flash to coincide with the instant when said selected character is in the projection axis of said selected lens.

2. Type composing apparatus having, in combination, a disk bearing a plurality of concentric character circles each having a plurality of characters, means to rotate said disk continuously about an axis passing through the center of said circles, image recording means having an image receiving surface intersected by said axis, a frame bearing as many lenses as there are circles of characters, each lens being supported in a predetermined position so that it projects successively to a common image position on said surface all of the characters in a corresponding circle as the disk is rotated, said image position being identical for all lenses and their corresponding circles, means to illuminate selectively by a flash of brief duration the portion of the disk in the projection axis of any selected lens corresponding to a circle containing a selected character, and means to time the instant of flash to coincide with the instant when said selected character is in the projection axis of said selected lens.

3. Type composing apparatus having, in combination, a rigid support bearing a plurality of character circles having their centers in a common axis and each having a plurality of characters, means to rotate said support continuously about said axis, means to support a sensitized sheet in position to receive an image focused on a predetermined image receiving surface intersected by said axis, a frame bearing as many lenses as there are circles of characters, each lens being supported in a predetermined position so that it projects successively to a common image position on said surface all of the characters in a corresponding circle as the support is rotated, said image position being identical for all lenses and their corresponding circles, means to illuminate selectively by a flash of brief duration the portion of the support in the projection axis of any selected lens corresponding to a circle containing a selected character, means to time the instant of flash to coincide with the instant when said selected character is in the projection axis of said selected lens, and spacing means to produce relative movement of the images on said sheet between successive projections thereof.

4. Type composing apparatus having, in combination, a rigid support bearing a plurality of character circles having their centers in a common axis and each having a plurality of characters, means to rotate said support continuously about said axis, a support for a sensitized sheet intersected by said axis, a frame bearing as many lenses as there are circles of characters, each lens being supported in a predetermined position so that it projects successively to a common image position on said sheet all of the characters in a corresponding circle as the support is rotated, said image position being identical for all lenses and their corresponding circles, means to illuminate selectively by a flash of brief duration the portion of the support in the projection axis of any selected lens corresponding to a circle containing a selected character, means to time the instant of flash to coincide with the instant when said selected character is in the projection axis of said selected lens, and spacing means to cause the sheet to move in relation to said image position to space successively projected character images on said sheet.

5. Type composing apparatus having, in combination, a disk bearing a plurality of concentric character circles each having a plurality of characters, means to rotate said disk continuously about an axis passing through the center of said circles, image recording means having an image receiving surface intersected by said axis, a plurality of frames each bearing as many lenses as there are circles of characters, the frames being mutually spaced along said axis between the disk and said surface, each frame being independently shiftable about said axis to and from a predetermined position wherein each of its lenses projects successively to a common image position on said surface all of the characters in a corresponding circle as the disk is rotated, the lenses of each frame forming images of a unique point size in said position, means to shift the frame corresponding to a selected point size to said predetermined position, means to illuminate selectively by a flash of brief duration the portion of the disk in the projection axis of any selected lens corresponding to a circle containing a selected character, and means to time the instant of flash to coincide with the instant when said selected character is in the projection axis of said selected lens.

6. The combination according to claim 5, wherein each frame is so apertured and positioned when a different frame is shifted to said predetermined position, as to admit the light projected by all of the lenses in said difference frame.

7. The combination according to claim 5, wherein each frame has a selected shift position and a non-selected shift position and is provided with apertures located in the non-selected position to open the light paths of all lenses on any one of the other frames that is shifted to the selected position.

8. A machine for composing type having, in combination, a keyboard for selecting the characters, code means operated by the keys of the keyboard to produce for each selected character a radial address code and an angular address code, a rigid support bearing a plurality of character circles having their centers in a common axis and each having a plurality of characters, means to rotate said support continuously about said axis, image recording means having an image receiving surface intersected by said axis, a frame bearing as many lenses as there are circles of characters, each lens being supported in a predetermined position so that it projects successively to a common image position on said surface all of the characters in a corresponding circle as the support is rotated, said image position being identical for all lenses and their corresponding circles, means actuated by the radial address code to illuminate selectively by a flash of brief duration the portion of the support in the projection axis of a selected lens corresponding to a circle containing the selected character, and means actuated by the angular address code to time the instant of flash to coincide with the instant when said selected character is in the projection axis of said selected lens.

9. The combination according to claim 8, wherein the code means produce a multichannel digital tape bearing the radial and angular address codes for the characters in the order of appearance of the characters in a selected line of type.

10. Type composing apparatus having, in combination, a rigid support bearing a plurality of character circles having their centers in a common axis and each having a plurality of characters, means to rotate said support continuously about said axis, image recording means having an image receiving surface, a frame bearing as many lenses as there are circles of characters, each lens being supported in a predetermined position so that it projects successively to a common image position on said surface all of the characters in a corresponding circle as the support is rotated, said image position being identical for all lenses and their corresponding circles, means to illuminate selectively by a flash of brief duration the portion of the support in the projection axis of any selected lens corresponding to a circle containing a selected character, and means to time the instant of flash to coincide with the instant when said selected character is in the projection axis of said selected lens.

11. A machine for composing type having, in combination, code means operable to produce for each selected character a pair of address codes, a rigid support bearing a plurality of character circles having their centers in a common axis and each having a plurality of characters, means to rotate said support continuously about said axis, image recording means having an image receiving surface, a frame bearing as many lenses as there are circles of characters, each lens being supported in a predetermined position so that it projects successively to a common image position on said surface all of the characters in a corresponding circle as the support is rotated, said image position being identical for all lenses and their corresponding circles, means to illuminate selectively by a flash of brief duration the portion of the support in the projection axis of any selected lens corresponding to a circle containing a selected character, and means operated by said pair of address codes to operate said illuminating means to project the selected character to said image receiving surface, one of said codes distinguishing a particular circle of characters by selection of its corresponding lens and the other of said codes distinguishing the particular character by producing a trigger impulse for said flash when said selected character has its image in said common image position.

References Cited in the file of this patent

UNITED STATES PATENTS 2,944,471 Drillick ---------------- July 12, 1960